No. 648,475. Patented May 1, 1900.
E. P. WHITE.
BRAZING CAP OR CARTRIDGE.
(Application filed June 5, 1899.)
(No Model.)
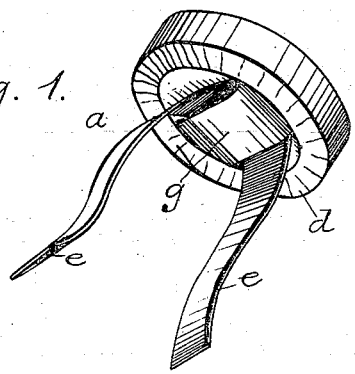
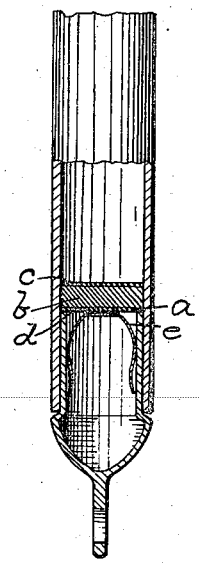
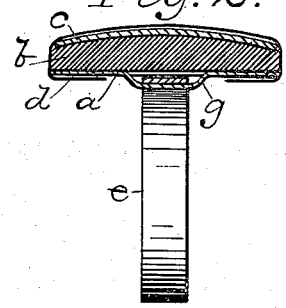
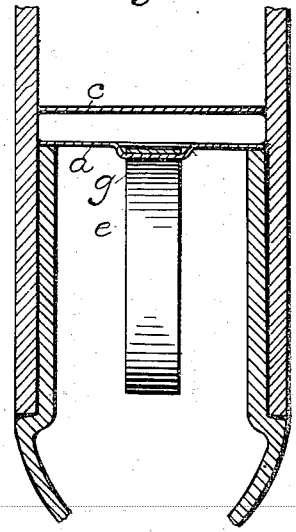
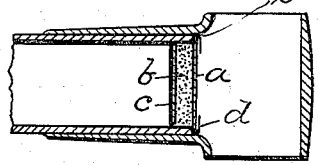
Witnesses:
J. M. Faxon
M. J. Friel.
Inventor:
Edmond P. White
By Frank D. Thomason
Atty

UNITED STATES PATENT OFFICE.

EDMOND P. WHITE, OF CHICAGO, ILLINOIS.

BRAZING CAP OR CARTRIDGE.

SPECIFICATION forming part of Letters Patent No. 648,475, dated May 1, 1900.

Application filed June 5, 1899. Serial No. 719,516. (No model.)

*To all whom it may concern:*

Be it known that I, EDMOND P. WHITE, a citizen of the United States, and a resident of Chicago, Cook county, Illinois, have invented certain new and useful Improvements in Brazing Caps or Cartridges, of which the following is a full, clear, and exact description, reference being had to the accompanying drawings and to the letters of reference marked thereon.

The object of my invention is to furnish a simply-constructed and cheap brazing-cap for tubular joints which is inserted and held in the joint during the brazing operation, so that the spelter and flux thereof are exuded and thoroughly solder the joint to an extent almost impossible when the operation is performed by hand. This I accomplish by the means hereinafter fully described and as particularly pointed out in the claims.

In the drawings, Figure 1 is a perspective view of my invention. Fig. 2 is a central section therethrough. Fig. 3 is a longitudinal section through a short length of tube with a bicycle-fitting inserted in the end thereof, showing my brazing-cap applied thereto before brazing. Fig. 4 is a similar view showing the said cap as it appears after brazing. Fig. 5 is a section through an outside joint, showing a slightly-modified form of my invention applied thereto before brazing.

In the drawings, *a* represents a disk of thin sheet-steel; *b*, a circular body of spelter and flux preferably not exceeding the diameter of said disk *a*; *c*, a thin sheet-steel disk not exceeding the diameter of disk *a*, and *d* represents a brass-foil wrapper enveloping the disks and spelter and secured in place by turning the edges thereof under disk *a*, as shown. This cap or cartridge is placed at or in the end of the male tube of the joint, and when subjected to the heat the spelter melts and spreads between and thoroughly solders the male and female parts of the joint together in a manner impossible to do by hand.

In order to hold the cartridge securely in place preparatory to brazing, I have provided the same with expanding prongs *e* for inside side joints, such as shown in Fig. 3 of the drawings, and increase the relative diameter of the disk *a* when used in connection with outside joints, such as shown in Fig. 5 of the drawings.

The prongs *e* referred to are preferably made by taking a strip of suitable spring-metal of the proper length and passing it lengthwise under the strap *g* of the cartridge, which is made by providing the disk *a* with two parallel transverse slits, as shown, and then forcing or bulging the metal between said slits downward. The metal strip is only passed under the strap until its center of length is reached, whereupon the end portions are bent into the shape shown in the drawings. When the cartridge is adjusted in place, these prongs *e* enter the tube and, expanding, hold the disk *a* securely over the edges of the tube, so that when the spelter and brass melt they will not enter said tube, but will permeate between the meeting surfaces of the joint.

When used for outside joints, the disk *a* is increased in diameter, as shown at *x* in Fig. 5, so as to rest upon the end edges of the male tube, while the brass and spelter portion of the cartridge project into the bore of the same.

After the brazing operation the upper disk *c* falls or settles down upon disk *a* and is soldered thereto by the residue of the spelter remaining upon disk *c*, and disk *b* becomes brazed to and closes the end of the male tube, thus preventing the spent cartridge from becoming loose in the tubes.

If desired, the disk *c* could be dispensed with; but as without it the surperfluous and unused spelter is more likely to resolve itself into globules, when the cartridge is spent, that become loose in the tubes and, in bicycle-frames particularly, rattle and make a disagreeable noise I prefer to use plate *c*.

What I claim as new is—

1. As an article of manufacture a cap or cartridge for brazing purposes consisting of an artificially-shaped body of spelter and flux and thin sheet-brass envelop.

2. As an article of manufacture a cap or cartridge for brazing purposes consisting of an artificially-shaped body of spelter and flux, a sheet-metal disk against which the same is placed and a thin sheet-brass envelop therefor.

3. As an article of manufacture a cap or cartridge for brazing purposes consisting of a suitably-shaped body of spelter and flux, two sheet-metal plates between which the same is sandwiched and a thin sheet-brass envelop therefor.

4. As an article of manufacture a cap or cartridge for brazing purposes consisting of a suitably-shaped body of spelter and flux, a sheet-metal plate against which the same is placed, a thin sheet-brass envelop therefor and means for adjusting and securing the cartridge in position.

5. As an article of manufacture a cap or cartridge for brazing purposes consisting of a suitably-shaped body of spelter and flux, a sheet-metal plate against which the same is placed, a thin sheet-brass envelop therefor and prongs secured to and projecting from said plate for adjusting and securing the cartridge in position.

6. As an article of manufacture, a cap or cartridge for brazing purposes consisting of a suitably-shaped body of spelter and flux, a sheet-metal plate against which the same is placed having an eye or strap formed by making two parallel slits therein and bulging the metal between them laterally, a thin sheet-metal brass envelop therefor, and prongs secured in said eye or strap of said plate and projecting therefrom for adjusting and securing the cartridge in position.

7. As an article of manufacture a cap or cartridge for brazing purposes consisting of a suitably-shaped body of spelter and flux, two sheet-metal plates between which the same is sandwiched, a thin sheet-brass envelop therefor, and prongs secured to and projecting from one of said plates for adjusting and securing said cartridge in brazing position.

EDMOND P. WHITE.

Witnesses:
ADA L. KETCHAM,
FRANK D. THOMASON.